United States Patent [19]

Belart

[11] Patent Number: 4,641,894
[45] Date of Patent: Feb. 10, 1987

[54] BRAKE SYSTEM

[75] Inventor: Juan Belart, Walldorf, Fed. Rep. of Germany

[73] Assignee: Alfred Teves GmbH, Frankfurt am Main, Fed. Rep. of Germany

[21] Appl. No.: 756,740

[22] Filed: Jul. 19, 1985

[30] Foreign Application Priority Data

Jul. 23, 1984 [DE] Fed. Rep. of Germany ....... 3427070

[51] Int. Cl.$^4$ ............... B60T 8/44; F15B 7/00
[52] U.S. Cl. ..................... 303/114; 60/560; 60/591; 303/116
[58] Field of Search .............. 303/92, 116, 114, 100, 303/119, 10; 60/560, 563, 566, 591

[56] References Cited

U.S. PATENT DOCUMENTS

| | | | |
|---|---|---|---|
| 3,907,376 | 9/1973 | Drutchas | 303/116 X |
| 3,999,808 | 12/1976 | Belart | 303/116 X |
| 4,404,803 | 9/1983 | Steffes | 60/563 X |
| 4,415,210 | 11/1983 | Belart et al. | 303/116 |
| 4,483,144 | 11/1984 | Steffes | 60/541 X |
| 4,492,413 | 1/1985 | Belart et al. | 303/114 X |
| 4,530,209 | 7/1985 | Steffes | 60/563 X |
| 4,555,144 | 11/1985 | Belart et al. | 303/119 X |

Primary Examiner—Douglas C. Butler
Assistant Examiner—Robert J. Oberleitner
Attorney, Agent, or Firm—James B. Raden; William J. Michals

[57] ABSTRACT

A brake system comprises a tandem master cylinder (24) with working pistons (19, 27), each of which confining a working chamber (25, 29). Upstream of the tandem master cylinder (24) a power booster (1) is connected which is connected to an auxiliary energy source (8) for the pressure supply. Connected to the booster chamber (3) are valves (22, 23) which are controllable by the pressure of the booster chamber (3) and by which a pressure medium communication may be established from the auxiliary energy source (8) to the working chambers (25, 29) of the tandem master cylinder (24) and a dynamic inflow of pressure medium takes place.

9 Claims, 1 Drawing Figure

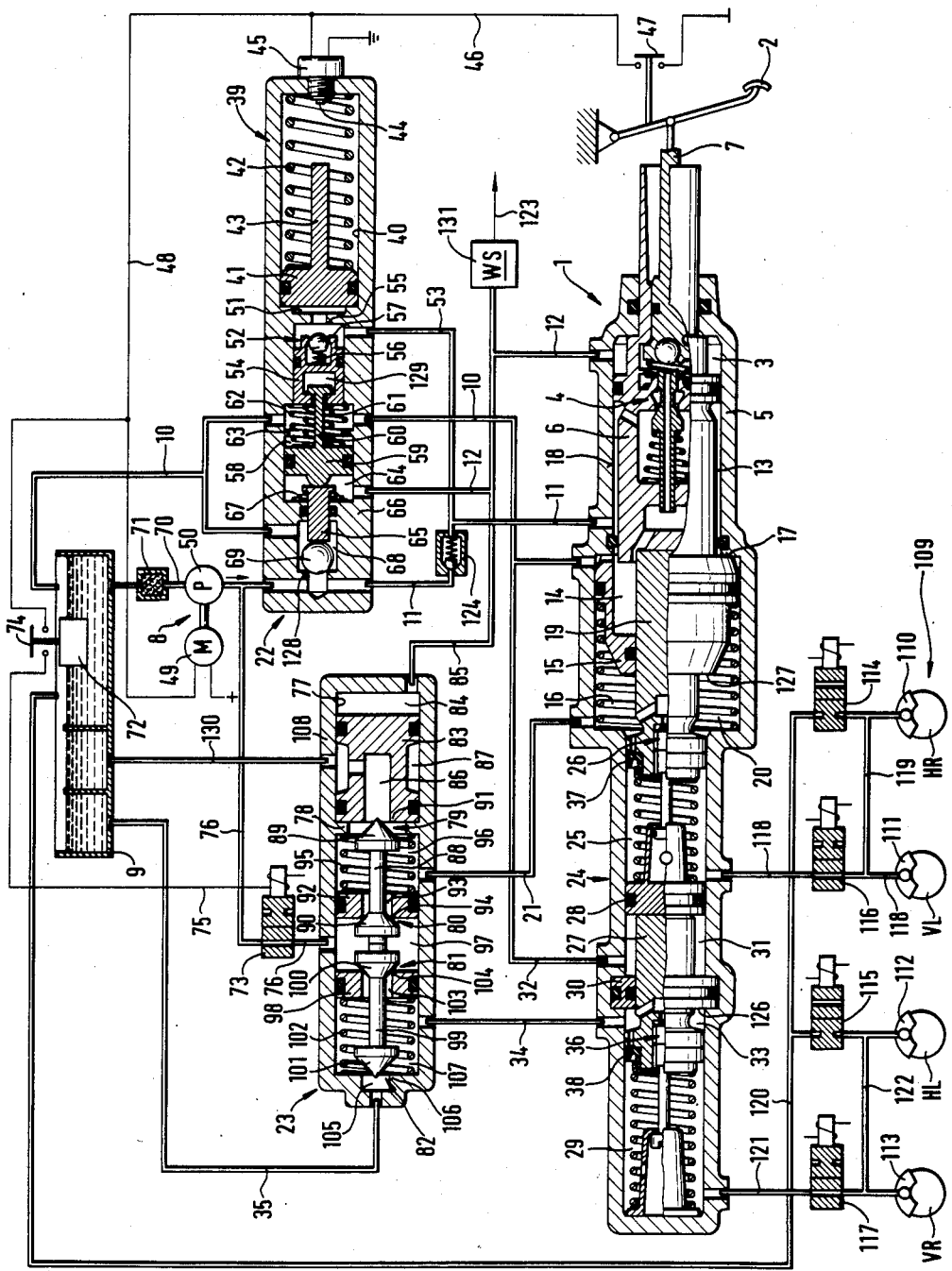

BRAKE SYSTEM

BACKGROUND OF THE INVENTION

This invention relates to a brake system for automotive vehicles, which is provided with a master brake cylinder and with a working piston confining a working chamber and communicating with at least one pressure chamber of a wheel brake. The system is provided with a power booster connected upstream of the master brake cylinder and connected to an auxiliary energy source for the purpose of pressure supply.

A brake system featuring the above characteristics is described in prior patent application no. P 33 15 731.6. In the brake system according to the prior suggestion a recharge of the pressure medium accumulator is impossible during a brake application after there has been a discharge of the pressure medium accumulator so that the entire auxiliary energy provided by the pressure medium pump directly reaches the hydraulic brake booster. In this described brake system it is considered less advantageous that, the more the foot pressure at the brake pedal increases, the more the booster piston is acted upon which is supplied with pressure by the auxiliary energy source and the more the pressures increase in the working chambers which, on their part, cause an increased expansion of the brake system components acted upon by the pressure. This also implies a corresponding increase in the respective travel of the individual working pistons and of the booster piston. However, as the travel of brake pedal also inreases as the respective travel of the working pistons and of the control piston increase the result may be that there is only a very small travel reserve at the brake pedal when high pressures are required.

This is of particular disadvantage when there is, for example, a failure of one brake circuit of a tandem master cylinder. In that case, in order to build up a pressure the respective working piston of the defective working chamber must be displaced over its full travel until it comes to a stop at the working piston in front of itself or a fixed abutment formed with the housing. In this instance, the travel at the brake pedal may become so large that there will be insufficient travel reserve if a sufficiently high hydraulic pressure in the brake system must be generated. Even if the remaining brake pedal travel would just suffice to generate the required pressure in the brake system, the driver would nevertheless be of the impression of a total failure of the brake system due to the very large brake pedal travel, the driver will no longer believe that braking the vehicle is possible with so long a brake pedal travel.

It is thus an object of this invention to further develop a brake system of the type described in such a manner as to ensure that, after a predetermined pedal travel, the brake pedal travel will not increase any further, with the brake pedal pressure and the braking pressure continuing to increase.

SUMMARY OF THE INVENTION

According to this invention this object is achieved in that valve means are connected at a booster chamber which are controllable by the pressure of the booster chamber and by means of which a pressure medium connection may be established from the auxiliary energy source to at least one working chamber of the master brake cylinder, and at the same time an annular surface of the working piston is pressurized in the brake's release direction. Due to this arrangement the pressure in the working chambers is statically generated until a predetermined brake pedal travel or a predetermined pressure in the working chambers has been reached. That is, the pressure of the working chambers results solely from the force acting on the working piston and from the surface of said working piston. After a predetermined pressure level, additional pressure medium starts to dynamically flow into the working chambers and the pressure in the working chambers continues to increase without the travel at the brake pedal increasing. The sudden inflow is controlled by the valve means arranged between the master cylinder and an auxiliary energy source.

In an advantageous embodiment of the present invention it is provided that the valve means consist of a first valve arrangement and of a second valve arrangement. The first valve arrangement consists of an arrangement controlling the pressure of the auxiliary energy source and the second valve arrangement consists of a valve opening in dependence on the pressure of the auxiliary energy source. The first valve arrangement controls the pressure of the auxillary source as a function of the pressure desired in the booster chamber. A stronger braking action and, hence, a higher pressure in the booster chamber will also lead to a higher pressure acting on the second valve arrangement. Thus, from a predetermined pressure onwards, the second valve arrangement opens its valves and enables a dynamic flow of pressure fluid into the working chambers. Because of this control, the auxiliary energy source only has to generate that much pressure medium as is required by the brake system in correspondence with a desired braking action or slowing-down. On the other hand, for the purpose of an efficient control, the second valve arrangement always receives only that pressure which corresponds to the pressure of the respective desired braking or slowing-down of a vehicle. Thus it is possible to determine relatively exactly the brake pedal stops, with the pressure in the working chambers further inreasing.

The control of the pump pressure of the auxiliary energy source may be achieved in a particularly simple manner in that the first valve arrangement is provided with a control chamber communicating with the prepressure chamber and confined by a control piston on the one side and by a valve piston on the other side. The control piston is caused, by a spring acting in the direction of the valve piston, to rest at the valve piston and the valve piston locking the connection from the auxiliary energy source to a compensation reservoir by way of a valve member and releasing the same when the force required for closing the valve member and acting on the valve piston is smaller than the force required for opening the valve member. By means of this arrangement, the pump pressure is controlled by the force of the valve spring and by the pressure of the booster chamber.

So as to enable the pressure fluid to flow into the respective working chamber, according to this invention, it is provided that the working piston is formed by a stepped piston whose additional chamber formed between the two portions may be connected with the auxiliary energy source by way of the second valve arrangement. This arrangement provides an additional chamber in a particularly simple manner, the additional chamber enabling additional fluid to flow into the working chamber.

So as to ensure that the fluid will only flow from the additional chamber in the direction of the working chamber, and not back, the present invention provides that the working chamber communicates with the additional chamber by way of a non-return valve opening in the direction of the working chamber. This non-return valve is formed by as gasket as is normally used in master cylinders.

Advantageously, a safety valve is arranged between the second valve arrangement and the auxiliary energy source which closes when the fluid level drops under the permissible minimum. Pressure fluid flowing dynamically into the working chamber, it is the function of the safety valve to lock in this manner to prevent a rapid discharge of the brake fluid out of the compensation reservoir. Otherwise, due to the rapid discharge of the flow medium out of the brake system, upon the next pressure build-up no additional pressure medium would be available which would imply the failure of the total brake system. The static pressurization caused by the closing of the safety valve prevents the pressure fluid from rapidly flowing off from the compensation reservoir.

In order to provide perfect bleeding of the master cylinder this invention provides that, at the working piston, a compensating chamber follows the side of the intermediate chamber averted from the working chamber. The compensating chamber is separated from the intermediate chamber by a separating piston. The separating piston also prevents the pressure medium from returning to the compensation reservoir when the fluid is flowing in dynamically.

So as to ensure that the additional chamber can be supplied with pressure medium which is under atmospheric pressure in the brake system's release position, and that upon application of the brake system and upon a simultaneous pressure drop in the booster chamber, the additional chamber is not pressurized, the present invention provides that the separating pistion is displaceable. The additional chamber is communicator with a compensation reservoir by way of a first valve which opens upon a failure of the pressure in the booster chamber and closes with the brake system being intact, only when the second valve arrangement is actuated. The valve enables a pressure build-up in the intermediate chamber and it prevents a pressure build-up when the brake system is defective. Due to this arrangement, in case of a circuit failure and with the separating piston being displaced with almost no force, a long idle travel is possible at the master cylinder.

A particularly simple design of the valve can be utilized wherein it consists of a first valve tappet actuatable by the second valve arrangement and of a slide piston which is displaceable in a bore and which, upon pressurization by the pressure of the booster chamber, approaches the first valve tappet and moves against an abutment formed with the housing and which, upon a further displacement of the first valve tappet towards the slide piston, closes the connection between the compensation reservoir and the additional chamber.

An integration of the valve into the second valve arrangement is achieved in that the slide piston borders on the chamber of the second valve arrangement, which is communicating with the additional chamber. A channel ends in an annular groove provided on the outer surface area of the slide piston and the annular groove is sealed on both sides relative to the bore receiving the slide piston. The channel at first extends radially away from the annular groove and then in the direction of motion of the slide piston towards the first valve. By means of this simple arrangement a multitude of components can be eliminated resulting in a simple second valve arrangement which can be easily manufactured.

In master cylinders of a simple design the separating piston is rigidly inserted into the housing of the master cylinder. This arrangement is especially expedient in those cases when, upon the actuation of the inventive master cylinder, the moving parts do not abut on the stationarily arranged separating piston.

If during an actuation of the brake system the fluid level within the compensation reservoir becomes excessive the present invention provides that when the fluid level reaches its minimum, the safety valve may be switched into its locking position by an impulse at the level guage of the compensation reservoir. This prevents brake fluid from flowing dynamically into the brake system as soon as it is indicated that there is a minumum fluid level in the compensation reservoir. This prevents the brake fluid from flowing too rapidly out of the brake system by way of a defective component.

Good control of the pump pressure is achieved according to the present invention in that the controlling arrangement of the first valve arrangement consists of a control valve which connects the compensation reservoir with the auxiliary energy source and which has a valve member and a valve piston. The valve piston keeps the control valve in a closing position by means of the force of a spring, which acts on a control piston, and simultaneously the confronting end faces of the pistons are pressurizable by the pressure of the booster chamber so as to open the valve. Because of the rating of the surfaces of the valve piston and of the control piston as well as of the force of the spring acting on the control piston the pump pressure can be kept relatively constant. Thus, it is easy to govern the actuation of the second valve arrangement. In this arrangement, the force of the spring, the surfaces of the pistons acted upon the booster chamber, as well as the surfaces at the valve of the first valve arrangement are coordinated such as to ensure that the valve of the second valve arrangement opens only upon a predetermined pressure of the booster chamber.

A particularly simple control of the second valve arrangement is achieved according the the present invention in that the second valve arrangement consists of a shuttle valve the sole closure member of which is formed by the valve tappet. Upon an actuation of the valve tappet the first valve interrupts the communication from the additional chamber to the compensation reservoir and simultaneously the second valve establishes the communication from the auxiliary energy source to the additional chamber. A pressure-dependent actuation of the second valve arrangement can be established in a simple manner with few components. The hydraulic-pressure-dependent flow-in velocity of the brake fluid entering a working chamber prevents unduly long brake pedal travel.

The brake pedal travel in master cylinders with several working chambers (i.e. in tandem master cylinders) considerably increases. The present invention provides that the master cylinder is a tandem master cylinder with a second working chamber and with a second working piston separating the first working chamber from the second working chamber and having a second intermediate chamber formed between a second annular piston and a second nonreturn valve opening in the direction of the second working chamber. The second intermediate chamber communicates with the compensation reservoir and the auxiliary energy source by way of a third valve and a fourth valve of the second valve arrangement. Because of this arrangement, a dynamic inflow of brake fluid is also possible in a tandem master cylinder. Thus, in this case the short brake pedal travel need not be any longer than the travel in a single-type master cylinder with but one working chamber.

In order to ensure that the brake pedal travel in a tandem master cylinder does not inrease excessively even in case of failure of a brake circuit or in case of failure of the auxiliary energy source, the present invention provides that, in case of a defective brake system, the first separating piston is mechanically displaceable in the direction of the working chamber against a compression spring and that, in case of an intact brake system, the first separating piston rests at an abutment fixedly formed with the housing. Due to the displaceability of the first separating piston, the booster piston displaces the separating piston towards the first working chamber when a predetermined travel of the booster piston has been exceeded. Thus, during this displacement, this arrangement supplies pressure fluid from the first additional chamber into the first working chamber by way of the first non-return valve. This dynamic inflow of brake fluid admittedly does not take place by means of the pump's volumetric delivery as is the case in an intact brake system, but in this instance takes place by means of the displacement of the separating piston, thus the brake pedal travel increasing. Such an arrangement is similar to master cylinders equipped with a filling stage.

When a predetermined pressure has been reached, the second valve arrangement of the brake system in accordance with the present invention opens its second valve and the pressure built up in the additional chamber may be relieved towards the compensation reservoir by way of the third and fourth valves of the second valve arrangement.

In order to prevent a dynamic flow of pressure fluid into the working chambers in the event of a failure of the auxiliary energy source, in acordance with a further feature of the present invention, an alarm switch is provided that between the booster chamber of the tandem master cylinder and the control chamber of the first valve arrangement which releases an alarm signal when the pressure drops below a predetermined level. In an auxiliary-energy supplied brake system with a brake slip control system, according to the present inention, a third valve arrangement is connected upstream of wheel brakes which is controllable by slip control electronics.

An especially compact and low-price construction of the valve arrangement is achieved wherein the first, second, and third valve arrangements are accommodated in a common housing. The compact construction is further improved wherein the valve arrangements and the tandem master cylinder together form a common housing.

BRIEF DESCRIPTION OF THE DRAWING

One embodiment of the present invnetion will be described in more detail in the following when taken in conjunction with the accompanying drawing wherein the single FIGURE provides a diagramatic illustration of the brake system in accordance with the present invention.

DETAILED DESCRIPTION

In the sole figure a schematically represented hydraulic power booster 1 can be seen which is operable by a brake pedal 2. The hydraulic power booster 1 has a booster chamber 3 wherein, upon application of a force to the brake pedal 2, a hydraulic pressure may be established by way of a brake valve 4, said hydraulic pressure being proportional to the respective actuation force exerted on the brake pedal 2.

The booster chamber 3 is formed by the housing 5 of the power booster 1 and by the booster piston 6 is sealed relative to the housing 5. The booster piston 6 receives the brake valve 4 in a central recess. Said brake valve 4 is connected with the brake pedal 2 by way of a push rod 7. By way of the brake valve 4, the booster chamber 3 is connectible with an auxiliary energy source 8, on the one hand, and with a compensation reservoir 9 filled with brake fluid, on the other hand.

The brake valve 4 is formed by a shuttle valve which, in the release position, establishes the communication from the booster chamber 3 to the compensation reservoir 9 by way of the compensating line 10 and which, upon actuation of the power booster 1, releases the communication from the auxiliary energy source 8 to the booster chamber 3 by way of the pressure line 11.

A control line 12 connected to the booster chamber 3 controls the hydraulic pressure of the auxiliary energy source 8 by way of a first valve arrangement 22. The pressure line 11 ends in a pre-pressure chamber 13 formed by the booster piston 6 and the housing 5. Towards the brake pedal 2, the pre-pressure chamber 13 is followed by the booster chamber 3.

In the direction of actuation of the power booster 1, the pre-pressure chamber 13 is followed by a compensating chamber 14 confined by the first separating piston 15 on the one side and by the booster piston 6 and the brake valve 4 on the side closer to the pedal.

A compression spring 16 keeps the separating piston 15 abutted on an abutment 17 formed fast with the housing. The separating piston 15 is guided radially outside on the surface area of the stepped bore 18 serving also to guide the booster piston 6. Radially inside, the separating piston 15 is guided on the surface area of the first working piston 9. Together with the first working piston 19 and the housing 5, the separating piston 15 forms the first additional chamber 20 which is under atmospheric pressure. By way of a connection line 21, the additional chamber 20 communicates with a second valve arrangement 23.

Towards the side of the power booster 1, which is more remote from the pedal, the first additional chamber 20 is followed by the tandem master cylinder 24 beginning with the first working piston 19. The first working piston 19 confines a first working chamber 25 which in the represented release position hydraulically communicates with the first additional chamber 20 by way of a first central valve 26. By way of the connection 21, the second valve arrangement 23, and the connection line 130, the first additional chamber 20 communicates with the compensation reservoir 9 which is under atmospheric pressure.

The first central valve 26 is moved to the left in the drawing by a rather small displacement of the first working piston 19 and interrupts the communication from the first working chamber 25 to the first additional chamber 20.

To the left in the drawing, the first working chamber 25 is followed by a second working piston 27 confining the first working chamber 25 in a pressure-sealed manner to the left by way of the seal 28. Towards the closed end of the stepped bore 18, the second working piston 27 is followed by the second working chamber 29. The working piston 27 is a stepped piston whose smaller portion faces the pedal-closer end. Resting at the surface area of the smaller portion of the second working piston 27 is a second separating piston 30 in a pressure-sealed manner, said second separating piston 30 being kept stationary within the housing 5. The second working piston 27, together with the separating piston 30 and the housing 5, forms the second supply chamber 31 communicating with the compensating line 10 by way of the compensating line 32. The separating pistons 15 and 30 have an annular surface 126 and 127 resulting from the large diameter less the smaller diameter of the working pistons 19 and 27.

Together with the second working piston 27 and the housing 5, the separating piston's 30 end closer to the second working chamber 29 forms the second additional chamber 33 which, in the release position of the brake system, is communicating with the compensation reservoir 9 by way of the line 34 the second valve arrangement 23, and the line 35. In the release position of the power booster 1 or rather in the release position of the tandem master cylinder 24, the second working chamber 29 communicates with the second additional chamber 33 by way of a second central valve 36. Upon a relatively small displacement of the second working piston 27, the second central valve 36 is mechanically closed and locks the connection from the second working chamber 29 to the second additional chamber 33.

By means of the first gasket 37 the working piston 19 seals the first working chamber 25 relative to the first additional chamber 20. The second gasket 38 fastened at the second working piston 27 seals the second working chamber 29 in respect of the second additional chamber 33. The two gaskets 37 and 38 are designed as non-return valves which allow pressure medium to flow from the additional chambers 20 and 33, respectively, into the respective working chambers 25 and 29 when the respective pressure in the additional chambers 20 and 33, respectively, is higher than that in the working chambers 25 and 29, respectively, and which in the reverse direction prevent the passage of flow medium.

In the valve arrangement 22 the reference numeral 39 designates a pressure accumulator wherein in a cylinder bore 40 an accumulator piston 41 is displaceable against a compression spring 42. An extension 43 projects from the accumulator piston 41 into the cylinder bore 40. The extension's 43 end averted from the accumulator piston 41 is arranged at a predetermined distance in respect of an actuating member 44 of a mechanically operable electric switch 45. The predetermined distance results from the position of the accumulator piston 41 in the uncharged condition of the pressure accumulator 39 as illustrated in the drawing.

On the other hand, by way of the electric line 46, the electric switch 45 is connected with a second electric switch 47 which is to be closed by the brake pedal 2 upon actuation. On the other hand, by way of a further electric line 48, said electric switch 45 is connected with an electric motor 49 of a pressure medium pump 50 serving as auxiliary energy source 8 of the illustrated brake system. Referring to the drawing, the left end of the accumulator piston 41 is followed by the accumulator chamber 51 of the pressure accumulator 39. The pressure in the accumulator chamber 51 is controlled by a valve 52 operable by the pressure of the booster chamber 3 and communicating with the already controlled pressure of the pressure medium pump 50 by way of the pressure lines 53 and 11.

The valve 52 consists of a ball 57 displaceable within a piston 54 in the direction of the valve seat 55 and against the force of a spring 56, said ball 57 abutting on the piston 54. In the illustrated initial position, the ball 57 is kept by the piston 54 at a distance in respect of the valve seat 55.

In the drawing, the left end face of the piston 54 borders on a cylindric chamber 58 which on the left side is confined by a control piston 59. The control piston 59 has a pin 60 engaged with the piston 54. In the illustrated release position of the first valve arrangement 22, a spring 62 acting on the control piston 59 in the chamber 58 urges the control piston 59 to the left in the drawing. The two pistons 54 and 59 are bound together by the pin 60 and the spring 61 presses the two pistons 54, 59 that much apart as to allow the pin 60 to abut on the piston 54. Between the end of the pin 60 and the piston 54 a clearance 129 is provided which allows a displacement of the piston 54 to the left.

By way of the compensating line 10, on the one hand, the chamber 58 is communicating with the compensating chamber 14 of the power booster 1 and, on the other hand, with the compensation reservoir 9. In the drawing, to the right of the control piston 59, an abutment 63 is provided at a certain distance. Said abutment 63 prevents an excessive displacement of the control piston 59 to the right in the drawing.

In the drawing, to the left of the control piston 59, a control chamber 64 is following which is communicating with the booster chamber 3 by way of the control line 12. A valve piston 65 is projecting into said control chamber 64. To the right in the drawing the valve piston 65 is kept in abutment on the control piston 59 by way of a valve spring 67 supporting itself at the housing 66 of the first valve arrangement 22. Referring to the drawing, the left end of the valve piston 65 projects into a chamber 68 which is under atmospheric pressure and which is communicating with the compensation reservoir 9 by way of the compensating line 10. To the left in the drawing, the valve piston 65 is followed by a valve member 69 formed by a ball and lifting off from the sealing seat under certain operational conditions and permitting pressure medium to flow off from the pressure medium pump 50 to the compensation reservoir 9 by way of the chamber 68 and by way of the compensating line 10.

The control piston 59, the valve piston 65, and the valve member 69 serve to control the pressure at the outlet of the pressure medium pump 50. The pressure medium pump 50 is communicating with the compensation reservoir 9 by way of a suction line 70. A filter 71 built into the suction line 70 serves to keep the pressure medium pump 50 clean.

The compensation reservoir 9 has a float 72 indicating the fluid level and triggering an electric contact 74 in case of too low a filling level and feeding the same to an electrically operable safety valve 73 by way of an electric line 75. Thereby the pressure medium connection from the pressure medium pump 50 to the second valve arrangement 23 is closed. Communication from the pressure medium pump 50 to the second valve arrangement 23 by way of the safety valve 73 is established by the pressure medium line 76.

The second valve arrangement 23 consists of a housing 108 with a bore 77 running in the longitudinal direction within the housing 108. The bore 77 is interrupted by a step 78 of smaller diameter. According to the drawing, to the left of the step 78 there are provided the first, second, third, and fourth valves 79, 80, 81 and 82 in the bore 77 whereas on the right side of the step 78 a slide piston 83 is guided within the bore 77. Referring to the drawing, together with the right end of the bore 77, the slide piston 83 forms a control chamber 84 which, by way of a feed line 85 and the control line 12 connected to the feed line 85, has a pressure medium communciation with the booster chamber 3. Referring to the drawing, from the left end of the slide piston 83 a channel 86 is extending which about in the middle of the slide piston 83 proceeds radially outwards, ending in an annular groove 87. The annular chamber formed by the annular groove 87 communicates with the compensation reservoir 9 by way of the connection line 21. The width of the annular groove 87 is rated such as to ensure that even upon a maximal displacement of the slide piston 83 the connection line 21 is always communicating with the annular groove 87.

The first and second valves 79, 80 are formed by a first valve tappet 88 with first and second sealing cones 89, 90 provided at the opposite ends. Together with the sealing seat 91 arranged at the opening of the channel 86, the first sealing cone 89 forms the first valve. Together with a second sealing seat 94 provided at a first annular piston 92 in a central first bore 93, the second sealing cone 90 provided at the left end of the annular piston 92 forms the second valve 80. The first annular piston 92 is sealed in the bore 77 and is guided axially displaceably there. A compression spring 95 supporting itself at the first annular piston 92 and at the step 78 presses the first annular piston 92 against the second sealing cone 90 (illustrated in the drawing), thus the first valve 79 being opened in the release position of the second valve arrangement 23. The first chamber 94 provided between the first and second valves 79, 80 serves as the flow medium communication of the two valves 79, 80.

In the drawing, to the left, the second valve 80 is followed by a control chamber 97. On the left, as seen in the drawing, the control chamber 97 is confined by a second annular piston 98, a second valve tappet 99 with third and fourth sealing cones 100 and 101 provided at the ends, and by a second compression spring 102. Together with the third sealing seat 104 arranged on the right end of the second bore 103, the third sealing cone 100 forms the third valve 81. Together with the fourth sealing seat 106 arranged on the end of the channel 105, the fourth sealing cone 101 forms the fourth valve 82.

Between the third and fourth valves 81, 82 and the bore 77 the second chamber 107 is arranged. By way of the fourth valve 82 and by way of the line 35, on the one hand, the second chamber 107 is communicating with the compensation reservoir 9 and, on the other hand, by way of the line 34, it is communicating with the second additional chamber 33. The arrangement of the first and second valves 79 and 80 in the bore 77 is symmetrical in respect of that of the third and fourth valves 81 and 82. Because of the compression springs 95 and 102, the two valve tappets 88 and 99 are supporting themselves with their confronting ends lying in the control chamber 97.

Thus, the second and third valves 80 and 81 are closed in the initial position, the first and fourth valves 79 and 82 being opened. The control chamber 97 is communicating with the safety valve 73 by way of the pressure medium line 76, said safety valve 73 being open when the brake system is intact. Again, by way of the pressure medium line 76, the safety valve 73 communicates with the pressure medium outlet of the pressure medium pump 50.

The third valve arrangement 109 consists of the individual wheel brakes 110, 111, 112, and 113 and of a pressure reduction valve 114 and of a pressure build-up valve, respectively, associated with the wheel brakes 110 and 111. A pressure reduction valve 115 and a pressure build-up valve 117 are likewise associated with the wheel brakes 112 and 113. The left front wheel brake 111 is communicating with the first working chamber 25 by way of the pressure line 118. Between the pressure build-up valve 116 and the left front wheel brake 111 a pressure line 119 is connected to the pressure line 118, said pressure line 119 supplying the right rear wheel brake 110 with pressure medium. Connected to the pressure line 119 is the pressure reduction valve 114 which is communicating with the compensation reservoir 9 by way of the return line 120.

A pressure line 121 extends from the right front wheel brake 113 to the second working chamber 29. The pressure build-up valve 117 is connected into the pressure line 121. Connected to the pressure line 121 provided between the pressure build-up valve 117 and the right front wheel brake 113 is the pressure line 122 which supplies the left rear wheel brake 112 with pressure medium. Between the pressure line 122 and the return line 120 the pressure reduction valve 115 is arranged.

Connected to the control line 12 is a hydraulically controllable alarm switch. When the pressure drops under a minimum pressure of approximately 5 bars, by way of an electric line 123, said alarm switch emits a contact to an electric alarm device not illustrated in the drawing and indicates to the driver during a brake application that there is a defect in the circuit of the power booster 1.

The mode of operation of the inventive brake system is as follows:

When switching on the ignition and thus simultaneously putting the electric power supply system of an automotive vehicle into operation the electric motor 49 of the pressure medium pump 50 is put into operation by the closed position of the electric switch 45 as, in the illustrated brake system, the accumulator piston 41 is on the far left side, which means that the pressure accumulator 39 is discharged. The pressure medium pump 50 now supplies pressure medium into the accumulator chamber 51 by way of the pressure line 11, by way of the pressure retaining valve 124, and by way of the pressure line 53, and along the valve seat 55. The charge will move the accumulator piston 41 to the right in the drawing, thereby the compression spring 42 being prestressed. As soon as the end of the projection 43 has reached the actuating member 44 of the electric switch 45, the electric switch 45 switches into the "OFF" position and the electric motor 49 and the pressure medium pump 50 come to a standstill. Because of the pressure accumulated, by way of the pressure line 11, pressure medium also enters the pre-pressure chamber 13 and reaches the brake valve 4.

Upon an actuation of the brake pedal 2, the second electric switch 47 connected to an electric power source not illustrated in the drawing is short-circuited, thus the electric motor 49 again being connected with the electric power source an a pressure-dependent control of the pump pressure of the pressure medium pump 50 taking place. The brake valve 4 at first closes the connection of the compensating chamber 14 communicating with the compensation reservoir 9 as well as the control line 12 to the safety valve 73.

Upon a further actuation of the brake pedal 2 or rather of the booster piston 6, the second valve of the brake valve 4 opens and pressure medium flows from the pre-pressure chamber 13 into the booster chamber 3 and, by way of the control line 12, into the control chamber 64. Due to the hydraulic boosting action in the booster chamber 3 the booster piston 6 moves to the left in the drawing. The force applied to the push rod 7 due to the hydraulic boosting action makes itself noted at the brake pedal 2 as a reaction force acting to the right in the drawing.

Due to the displacement of the booster piston 6 to the left the same comes to abut on the first working piston 19 and carries the same along to the left in the drawing during a further displacement. Thereby the first central valve 26 is closed, a small pressure building up in the first working chamber 25. Due to the pressure in the first working chamber 25, the second working piston 27 is displaced to the left in the drawing, the second central valve 36 also becoming closed. The closing of the central valves 26, 36 is effected by the prestressing devices provided in the working chambers 25, 29 and not discussed in detail here.

The pressure medium is supplied from the working chambers 25, 29 to the wheel brakes 110, 111, 112, and 13 by way of the pressure lines 118 and 121 and by way of the pressure build-up valves 116 and 117, the wheel brakes 110, 111, 112, and 113 exerting a braking torque on the friction discs. The vehicle is braked to a more or lesss strong degree in correspondence with the position of the brake pedal 2.

Simultaneously, the pressure in the booster chamber 3 has caused the slide piston 83 to abut on the step 78. From a certain pressure level at the outlet of the pressure medium pump 50 onwards, in the bore 77 of the second valve arrangement 23 the annular pistons 92 and 98 both move away from each other against the force of the associated compression springs 95 and 102, respectively. The displacement of the annular pistons 92 and 98 starts when the pressure at the outlet of the pressure medium pump 50 is so strong that the force exerted on the annular pistons 92 and 98 due to the hydraulic pressure is stronger than the prestressing force of the compression springs 95 and 102.

Simultaneously with the annular pistons 92 and 98 the valve tappets 88 and 99 are also moving away from each other until their sealing cones 98 and 101 are resting in a pressure-sealed manner at the sealing seats 91 and 106. The chambers 96 and 107 now are separated from the compensation reservoir 9. Upon a further pressure increase in the control chamber 97, the annular pistons 92 and 98, with their sealing seats 94 and 104, lift off from the sealing cones 90 and 100. Now, there exists a pressure medium communication from the outlet of the pressure medium pump 50 to the associated additional chambers 20 and 33, respectively, by way of the safety valve 73, the control chamber 97, the chambers 96 and 107, the lines 21 and 34.

In the first and second additional chambers 20 and 33 the hydraulic pressure increases, thus pressure medium being able to dynamically flow into the working chambers 25 and 29 by way of the gaskets 37 and 38 designed as non-return valves. Due to the pressure medium's dynamically flowing into the working chambers 25 and 29 and into the wheel brakes 110, 111, 112, and 113 communicating with the working chambers 20 and 33 the brake pedal 2 is prevented from further displacing itself to the left in the drawing. The more the force at the brake pedal 2 increases, the more the pressure goes up in the booster chamber 3 and the more brake fluid flows dynamically into the working chambers 25 and 29.

When the braking action is reduced the brake pedal 2 moves to the right in the drawing. In doing so, the operations described above will take place in the reversed order. By way of the pressure reduction valves 114, 115 controlled by non-illustrated electronics only the surplus of brake fluid existing due to the dynamic inflow is removed towards the compensation reservoir 9 in correspondence with the brake pedal's position.

Upon a sudden pressure drop in the booster chamber 3 due to a leak the slide piston 83 of the second valve arrangement 23 moves to the right in the drawing. Thus the first valve 79 and the fourth valve 82 are opened, thereby the additional chambers 20 and 33 communicating with the compensation reservoir 9 which is under atmospheric pressure. Now, a dynamic inflow is no longer possible and any pressure increase in the working chambers 25 and 29 only takes place by means of a static pressure build-up, i.e. only due to the displacement of the working pistons 19 and 27 to the left in the drawing. Thereby it is prevented that due to the defective auxiliary energy supply system, within no time, unnecessary amounts of pressure medium may flow off out of the compensation reservoir 9 by way of the leak spot which would very soon lead to a total failure of the brake system.

A similar effect is also achieved by the safety valve 73. The safety valve 73 is namely closed when the fluid level in the compensation reservoir 9 has dropped under a permissible level. In such an instance the electric switch 74 connected with the float 72 is short-circuited, thus the safety valve 73 being connected with the electric power source and locking the communication from the control chamber 97 to the outlet of the pressure medium pump 50.

The first valve arrangement 22 serving to control the pump pressure and to charge the pressure accumulator 39 works as follows:

As soon as a braking action is initiated the pressure medium pump 50 starts supplying pressure medium due to the actuation of the switch 47. Now, with preference the pre-pressure chamber 113 is supplied with pressure medium. As soon as, in case of a full brake application, the entire pressure medium is required in the booster chamber 3, the pressure increasing in the control chamber 64 has the effect that the valve piston 65 and the valve member 69 are urged to the left in the drawing, the connection from the pressure medium pump 50 to the compensation reservoir 9 being locked. Thereby it is ensured that the full pump pressure acts on the pre-pressure chamber 13. Due to the pressure of the control chamber 64 the control piston 59 moves against the force of the spring 62. Due to the spring 61 the piston 54 is likewise moved to the right in the drawing. In doing so, the ball 57 comes to abut on the valve seat 55. Thus the connection becomes locked which existed from the accumulator chamber 51 to the pressure medium pump by way of the pressure lines 53 and 11. It is no longer possible to charge the pressure accumulator 39, thus the entire pressure medium of the pressure medium pump 50 being available for the power booster 1.

The brake pedal 2 again being moved to the right in the drawing, i.e. a reduction of the braking of a vehicle taking place, the pressure in the booster chamber 3 also diminishes. Thereby the control piston 59 and the piston 54 are caused to move to the left in the drawing. If required, the accumulator chamber 51 can be charged again. The pressure at the valve piston 65 also diminishes, thus the pump pressure again effecting a displacement of the valve piston 65 and of the valve member 69 to the right in the drawing and a reduction of the pump pressure towards the compensating reservoir 9 becoming possible.

It is the pressure accumulator's 39 function to supply the pressure medium required at the beginning upon a sudden braking operation as, in the initial phase, the pressure medium pump 50 does not generate the required volumetric flow of high pressure.

The sensors required for brake slip control systems for measuring the velocity of the wheels and the electronics for the generation of the control signals for the pressure reduction and pressure build-up valves 114, 115 and 116, 117 are not illustrated in the drawing.

What is claimed is:

1. A brake system for automotive vehicles, which is provided with a master brake cylinder and with a working piston confining a working chamber and communicating with at least one pressure chamber of a wheel brake and which is provided with a power booster connected upstream of the master brake cylinder and connected to an auxiliary energy source for the purpose of pressure supply, wherein valve means (22, 23) are connected at a booster chamber (3) which are controllable by the pressure of the booster chamber (3) and by means of which a pressure medium connection is established from the auxiliary energy source (8) to at least one working chamber (25) of the master brake cylinder (24), at the same time an annular surface (127) of the working piston (19) is pressurized in the brake's release direction, wherein the valve means comprise a first valve arrangement and a second valve arrangement (22 and 23), the first valve arrangement (22) comprising an arrangement controlling the pressure of the auxiliary energy source (8) and the second valve arrangement (23) comprising a valve (80) opening in the dependence on the pressure of the auxiliary energy source (8), and, wherein the first valve arrangement (22) has a control chamber (64) communicating with a pre-pressure chamber (13) and confined by a control piston (59) on the one side and by a valve piston (65) on the other side, the control piston (59) being caused by a spring (62) acting in the direction of the valve piston (65) to rest at the valve piston (65) and the valve piston (65) blocking the connection from the auxiliary energy source (8) to a compensation reservoir (9) by way of a valve member (69) and releasing the same, when the force required for closing the valve member (69) and acting on the valve piston (65) is smaller than the force required for opening the valve member (69).

2. A brake system as claimed in claim 1, wherein the working piston (19) is formed by a stepped piston having additional chamber (20) formed between two portions thereof and which is connected with the auxiliary energy source (8) by way of the second valve arrangement (23).

3. A brake system as claimed in claim 1, wherein the working chamber (25) communicates with said additional chamber (20) by way of a non-return valve (37) opening toward the working chamber (25).

4. A brake system as claimed in claim 1, wherein a safety valve (73) is arranged between the second valve arrangement (23) and the auxiliary energy source (8) which closes when the fluid level drops under a permissible minimum.

5. A brake system for automotive vehicles, which is provided with a master brake cylinder and with a working piston confining a working chamber and communicating with at least one pressure chamber of a wheel brake and which is provided with a power booster connected upstream of the master brake cylinder and connected to an auxiliary energy source for the purpose of pressure supply, wherein valve means (22, 23) are connected at a booster chamber (3) which are controllable by the pressure of the booster chamber (3) and by means of which a pressure medium connection is established from the auxiliary energy source (8) to at least one working chamber (25) of the master brake cylinder (24), at the same time an annular surface (127) of the working piston (19) is pressurized in the brake's release direction, wherein at the working piston (19), a compensating chamber (14) and an intermediate chamber (20) are located on one side of averted from the working chamber (25), said compensating chamber (14) being separated from the intermediate chamber (20) by means of a separating piston (15), wherein the separating piston (15) is displaceable; and wherein an additional chamber (20) communicates with a compensation reservoir (9) by way of a first valve (79) which opens upon a failure of the pressure in the booster chamber (3) and, with the brake system being intact, closes only when the second valve arrangement (23) is actuated, and wherein a first valve (79) consists of a first valve tappet (88) actuatable by the second valve arrangement (23) and of a slide piston (83) which is displaceable in a bore (77) and which, upon pressurization by the pressure of a booster chamber (3), approaches the first valve tappet (88) and moves against an abutment (78) fixedly formed with a housing and which, upon an additional displacement of the first valve tappet (88) towards the slide piston (83), closes the connection between the compensation reservoir (9) and the additional chamber (20).

6. A brake system as claimed in claim 5, wherein the slide piston (83) borders on a chamber (96) of the second valve arrangement (23), which communicates with the additional chamber (20); wherein a channel (86) ends in an annular groove (87) provided on the outer surface area of the slide piston (83); wherein the annular groove (87) is sealed on both sides relative to the bore (77) receiving the slide piston (83); and wherein the channel (86) at first extends radially away from the annular groove (87) and then in the direction of motion of the slide piston (83) towards the first valve (79).

7. A brake system for automotive vehicles, which is provided with a master brake cylinder and with a working piston confining a working chamber and communicating with at least one pressure chamber of a wheel brake and which is proivided with a power booster connected upstream of the master brake cylinder and connected to an auxiliary energy source for the purpose of pressure supply, wherein valve means (22, 23) are connected at a booster chamber (3) which are controllable by the pressure of the booster chamber (3) and by means of which a pressure medium connection is established from the auxiliary energy source (8) to at least one working chamber (25) of the master brake cylinder (24), at the same time an annular surface (127) of the working piston (19) is pressurized in the brake's release direction, wherein the valve means comprise a first valve arrangement and a second valve arrangement (22 and 23), the first valve arrangement (22) comprising an arrangement controlling the pressure of the auxiliary energy source (8) and the second valve arrangement (23) comprising a valve (80) opening in dependence on the pressure of the auxiliary energy source (8), and, wherein the controlling arrangement of the first valve arrangement (22) consists of a control valve (128) which connects a compensation reservoir (9) with the auxiliary energy source (8) and which has a valve member (69) and a valve piston (65), the valve piston (65) keeping the control valve (128) in a closing position by means of the force of a spring (62), which acts on a control piston (59), and simultaneously the confronting end faces of the pistons (59 and 65) are pressurizable by the pressure of the booster chamber (3) so as to open the valve (128).

8. A brake system as claimed in claim 7, wherein the force of a spring (62), surfaces of the pistons (59 and 65) acted upon by the booster chamber (3), and the surface at the control valve (128) which is pressurized by the pump pressure cooperate to ensure that a valve (80) of the second valve arrangement (23) opens only upon a predetermined pressure of the booster chamber (3), at the same time a valve closing.

9. A brake system as claimed in claim 8, wherein the second valve arrangement (23) comprises a shuttle valve (79 and 80), the sole closure member of which is formed by a valve tappet (88), upon an actuation of the valve tappet (88) the first valve (79) interrupting the communication from the additional chamber (20) to a compensation reservoir (9) and simultaneously the second valve (80) establishing the communication from the auxiliary energy source (8) to the additional chamber (20).

* * * * *